Dec. 15, 1964    W. D. HUSTON    3,161,062
CLUSTER GAUGE
Filed Nov. 15, 1961    2 Sheets-Sheet 1
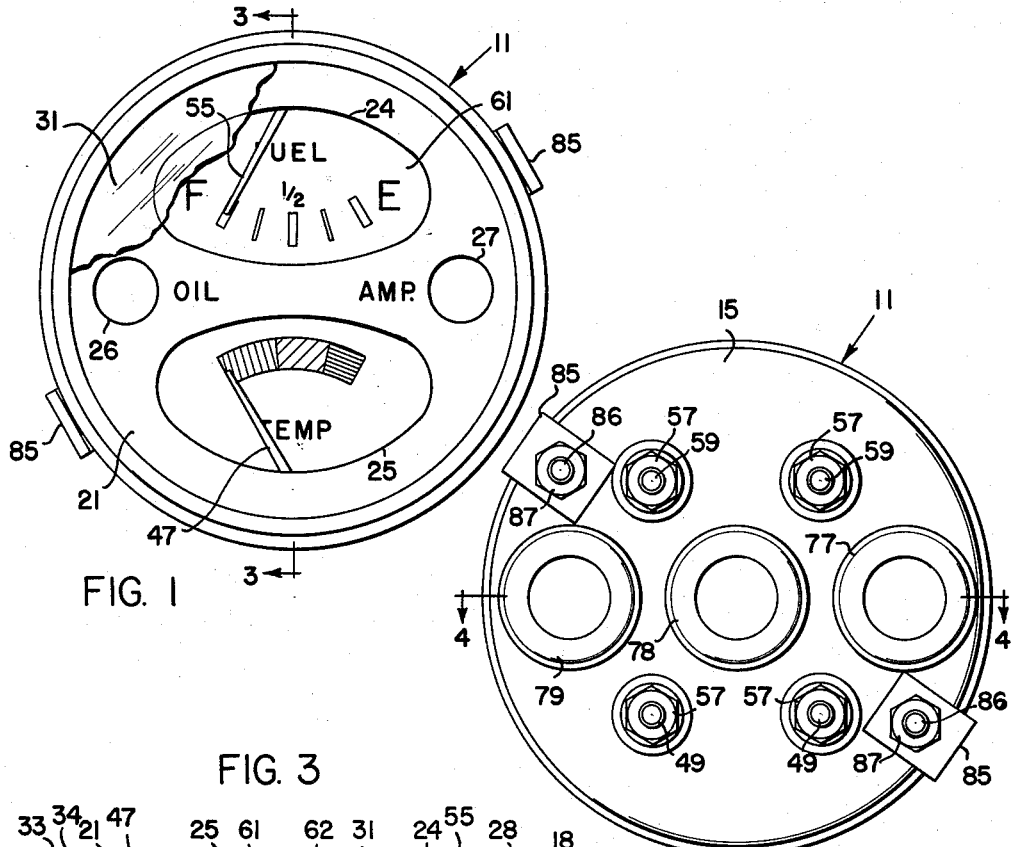
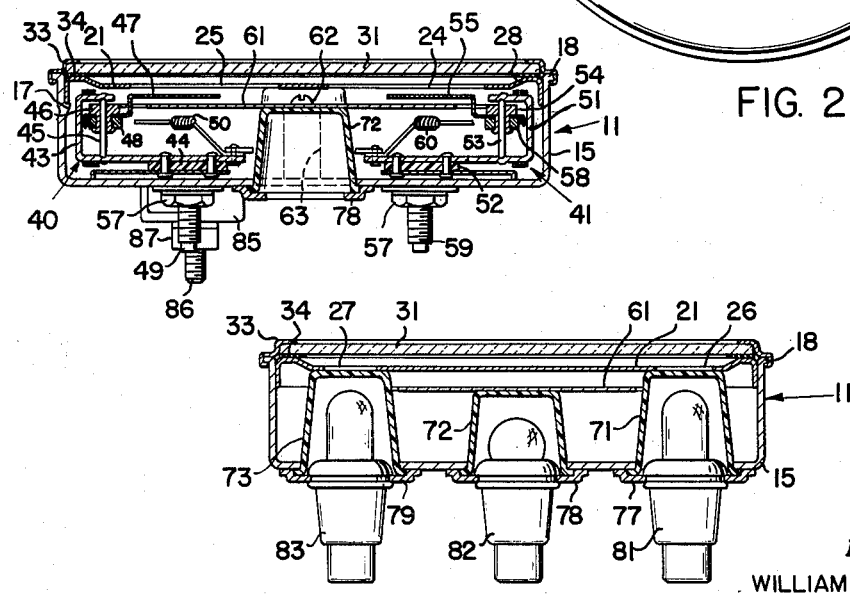
INVENTOR.
WILLIAM D. HUSTON
BY
Attorney

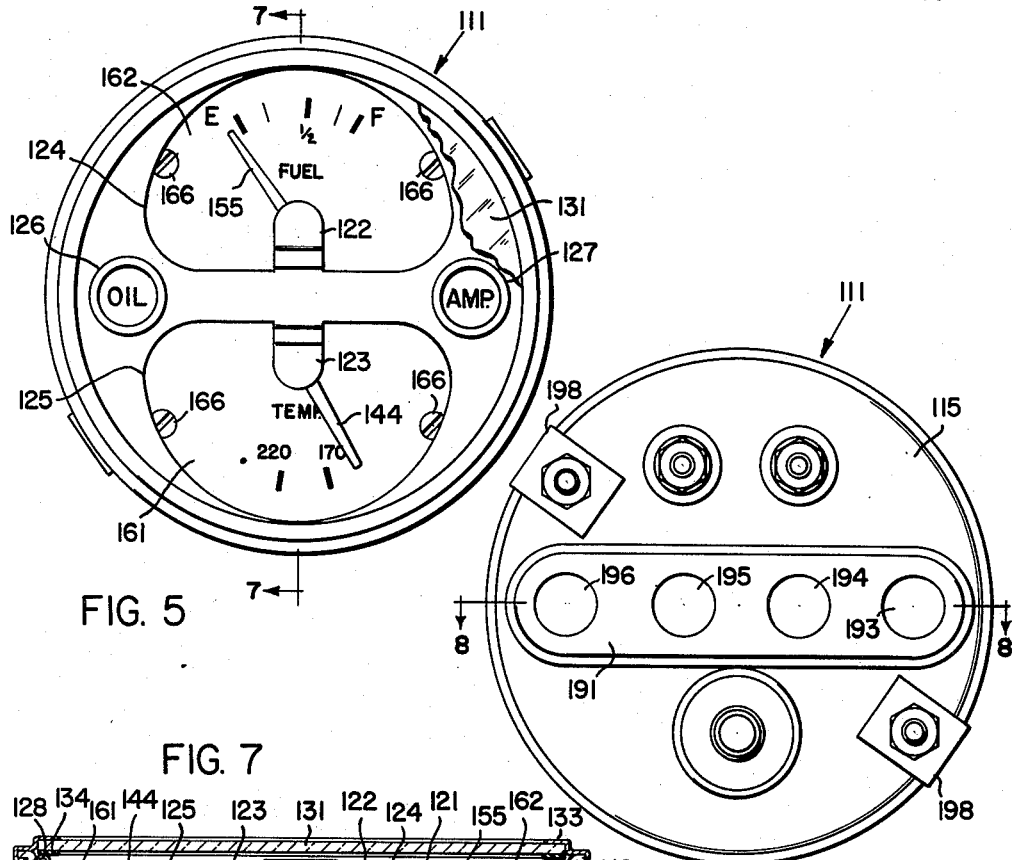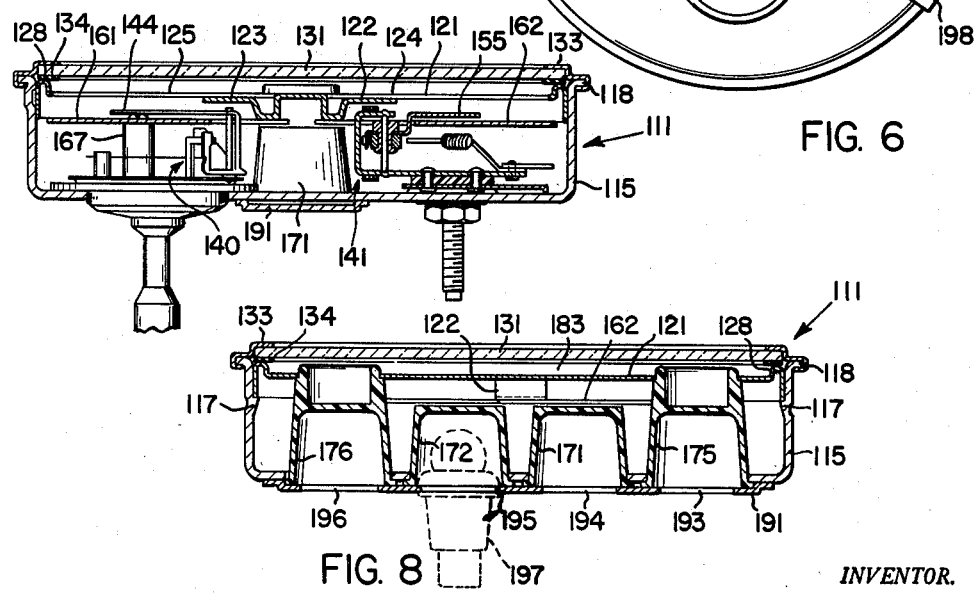

United States Patent Office 3,161,062
Patented Dec. 15, 1964

3,161,062
CLUSTER GAUGE
William D. Huston, Rochester, N.Y., assignor to American-Standard Controls Division, a division of American Radiator & Standard Sanitary Corporation, Rochester, N.Y., a corporation of Delaware
Filed Nov. 15, 1961, Ser. No. 152,596
5 Claims. (Cl. 73—431)

This invention relates to gauges, and more particularly to gauges for heavy automotive equipment, such as tractors, earth movers, and the like.

It is customary on automotive vehicles to employ a plurality of gauges to indicate, among other things, oil pressure, cooling system temperature, generator output, and the amount of gasolene or other fuel in the fuel tank. In the case of farm and construction equipment particularly, it is desirable to group the indicators of the gauges so that they may be readily viewed at a glance by the operator of the vehicle. To this end, it has been the practice to assemble the gauge indicators in an instrument cluster or gauge assembly contained in a single housing and secured in a single aperture in the dashboard of the vehicle.

One major problem with instrument cluster assemblies has been the difficulty of preventing dust and moisture from entering the cluster gauge housing. On farms or construction projects it is not unusual for a vehicle to be parked out in the open day and night, and month after month. Moreover, the vehicles are operated in all sorts of weather and create clouds of dust. Thus, the gauges are constantly exposed to dust, oil, vapor, sunlight, rain, and weather generally. As a result, dust and moisture penetrate the cluster gauge housings and interfere with proper operation of the indicator devices assembled therein.

Moreover in prior instrument cluster or gauge assemblies the illuminating means illuminate, in varying degrees of intensity, the scales or graduated dials of the different instruments of the assembly.

One object of this invention is to provide a fully sealed instrument cluster or gauge assembly which will be moisture proof and dust proof.

Another object of this invention is to provide an improved, illuminated cluster gauge assembly wherein the light source is so disposed that the light is distributed or diffused with relatively uniform intensity across the dials of all the instruments in the assembly.

Another object of this invention is to provide an improved cluster gauge assembly wherein each of the light bulbs for illuminating the assembly is sealed in an individual housing to prevent entry of moisture or dust into the assembly whether or not there are bulbs in the bulb housings.

Other objects of the invention will be apparent hereinafter from the specification and from the recital of the appended claims, particularly when read in conjunction with the accompanying drawings.

In the drawings:

FIG. 1 is a front view of an instrument cluster or gauge assembly made according to one embodiment of this invention;

FIG. 2 is a rear view of this assembly;

FIG. 3 is a sectional view taken along the line 3—3 of FIG. 1 and looking in the direction of the arrows;

FIG. 4 is a sectional view taken along the line 4—4 of FIG. 2 and looking in the direction of the arrows;

FIG. 5 is a front view of an assembly made according to another embodiment of this invention;

FIG. 6 is a rear view of the assembly shown in FIG. 5;

FIG. 7 is a sectional view taken along the line 7—7 in FIG. 5 and looking in the direction of the arrows; and FIG. 8 is a sectional view taken along the line 8—8 of FIG. 6 and looking in the direction of the arrows.

The invention is illustrated in connection with two different types of instrument cluster assemblies. In certain respects these two assemblies are similar. For instance, each employs two, condition responsive bulbs to indicate, respectively, oil pressure (OIL) and generator output (AMP.), and two dial type instruments to indicate, respectively, the amount of fuel in the fuel tank (FUEL) and the temperature in the cooling system (TEMP.) Moreover, in each of the two types of gauges means is provided for illuminating the respective pointers and dials associated with the FUEL and TEMP. indicators. The differences in the two illustrated embodiments are primarily in the manner in which the FUEL and TEMP. indicators are mounted in their respective gauges; and in the different dispositions of the illuminating means in the respective gauges.

Referring now to the drawings by numerals of reference, and first to the embodiment of the invention illustrated in FIGS. 1 to 4 inclusive, the cluster assembly is designated generally at 11. It comprises a cup-shaped casing 15 which terminates at its upper end in an outwardly directed marginal flange 18. Positioned snugly within the casing 15 adjacent its upper end is an inverted, cup-shaped mask 21. The marginal edge of the depending annular sidewall of this mask 21 rests upon a plurality of projections 17 struck inwardly from the side wall of the casing. As shown more clearly in FIG. 3, the inverted cup-shaped mask 21 is centrally dished, and has four, spaced openings therethrough two of which, 24 and 25, are oval in shape and the other two of which, 26 and 27, are circular. The oval openings 24 and 25 are spaced from one another on opposite sides of the centerline of casing 15; and the major axes thereof extend parallel to one another. (See FIG. 1.) The circular openings 26 and 27 are disposed, respectively, adjacent opposite ends of the oval openings 24 and 25, and their centerlines lie in a line extending midway between and parallel to the major axes of the oval openings.

A circular cover glass 31 is seated on the portion 28 of mask 21 which is adjacent the periphery thereof. It is secured in place by means of conventional bezel 33 that interlocks with the flange 18 of the casing. An annular gasket 34 is adapted to be interposed between the confronting surfaces of the portion 28, the cover glass 31 and the bezel 33, so that the casing 15 is effectively sealed against the entry of moisture or dust therewith from the front.

Mounted opposite one another in casing 15 are two generally designated indicator units 40 and 41. Since units 40 and 41 may be of standard construction, such as shown, for instance, in U.S. Patent No. 2,867,769 they will not be described in detail here. Instead, only those parts of the respective units 40 and 41 which have some effect upon the illumination of the gauge face will be discussed. In FIG. 3, for instance, it will be noted that unit 40 comprises a generally U-shaped bracket 43 which lies on its side and which has one leg longer than the other. The longer leg of bracket 43 is riveted to a portion struck up from the bottom of the casing and is insulated from the casing by an insulating block 44. The legs of the U-shaped bracket 43 extend inwardly toward the center of casing 15 and have mounted therebetween, for oscillation about a vertical axis a pointer shaft 45. Secured on a bushing 46 mounted on this shaft and extending inwardly toward the center of casing 15 is an elongate pointer 47 which is adapted to oscillate with bushing 46. Mounted on bushing 46 is a magnet 48. A coil 50 cooperates therewith.

Similarly, indicator unit 41 comprises a generally U-shaped bracked 51 which has one leg longer than the other. The longer leg of bracket 51 is riveted to the casing 15; and there is an insulating block 52 interposed between the bottom of the casing 15 and this longer arm. The legs of bracket 51 face inwardly toward the center of casing 15 and have mounted therebetween, for oscillation about a vertical axis, a shaft 53. Secured to bushing 54, and extending inwardly toward the casing center and coplanar with pointer 47, is an elongate pointer 55 which is adapted to oscillate with the shaft 53. Mounted on bushing 54 is a magnet 58 which is adapted to cooperate with an electrical coil 60. Pointers 47 and 55 lie beneath and are in registry with the oval apertures 25 and 24, respectively, in the mask 21.

Indicator units 40 and 41 are adapted to be electrically operated by means of conventional remote electrical senders that are responsive to the temperature of the coolant of a vehicle and the level of fuel in the vehicle's tank, respectively. Bolts 49 and 59 function as terminals for the respective units; and the wire leads to the respective terminals are secured thereto by means of nuts 57 which are threaded over the ends of the bolts 49 and 59.

Mounted beneath the pointers 47 and 55 is a dial plate 61. Plate 61 is secured by means of screws 62 to the tops of two diametrically opposite spacers 63 (only one of which is shown in FIG. 3) which are secured to and extend upwardly from the bottom of casing 15. The upper face of dial plate 61 is inscribed on opposite sides of its centerline with FUEL and TEMP. indicia, respectively. The FUEL indicia lie beneath pointer 55 in registry with the oval aperture 24 in mask 21, and the TEMP. indicia are disposed beneath pointer 47 in registry with the oval aperture 25.

Extending into the casing through circular apertures in the bottom of casing 15 are three plastic, inverted, cup-shaped, truncated-conical bulb housings 71, 72 and 73. The top, closed ends of the bulb housings 71 and 73 abut the bottom of mask 21 coaxially of the respective circular apertures 26 and 27 in the mask and serve as a seat for the mask. (See FIG. 4.) The upper, closed end of housing 72 abuts the bottom of the dial plate 61 at the center of casing 15.

Each of the bulb housings has a marginal flange around its bottom end; and the bulb housings are secured snugly against the outer face of the bottom of casing 15 by means of annular caps 77, 78 and 79, respectively. The outer marginal edge of each of the annular caps 77, 78, 79 is spot welded or riveted to the back of casing 15 whereby the corresponding bulb housing is held snugly and securely in position in casing 15. To positively seal off the apertures in the back of casing 15 through which the bulb housings 71, 72, 73 pass, annular sealing gaskets (not illustrated) are interposed between the marginal flanges of the bulb housings and the casing 15. The inverted cups 71, 72 and 73, however, themselves also serve to seal the casing against entry of dust or moisture thereinto.

As shown in FIG. 4, the circular openings in the annular caps 77, 78, 79 are adapted to receive and snugly retain therein conventional snap-in bulb assemblies designated at 81, 82 and 83, respectively. The bulbs in housings 71 and 73 are adapted to function as conditionresponsive indicators for the oil pressure (OIL) and generator output (AMP.) of the vehicle, respectively. Similar to the TEMP. and FUEL indicator units 40 and 41, the bulb assemblies 81 and 83 are adapted to be energized by electrically operated remote senders. The annular walls of the bulb housings 71 and 73 are preferably made opaque, while their upper closed ends are preferably colored a bright, clear red. Housings 71 and 73 therefore transmit light only through their closed ends. When the bulb in either assembly 81 or 83 is illuminated, the operator of the vehicle will be able to observe the corresponding red warning light through aperture 26 or 27. As shown in FIG. 1, mask 21 is inscribed adjacent the apertures 26 and 27 with the designations OIL and AMP., respectively, to designate the nature of the adjacent indicator.

Bulb housing 72 is, however, intended to illuminate the pointers 47 and 55 and the indicia on dial plate 61. The entire bulb housing 72 is therefore rendered transparent or translucent so that light is capable of being transmitted through both its closed end and annular wall.

In the embodiment illustrated in FIGS. 1–4, the gauge casing 15 is adapted to be mounted in a vehicle by means of the mounting brackets 85 (FIG. 2) which are secured to the back of casing 15 by bolts 86 and nuts 87. The casing 15 being otherwise sealed around cover glass 31 and bolts 49 and 59, the sealed bulb housings 71, 72, 73 prevent dust and moisture from entering the interior of casing 15 regardless of whether or not the bulb assemblies 81, 82, 83 have been inserted into the back of casing 15.

Referring now to the embodiment illustrated in FIGS. 5 to 8, the gauge assembly designated generally at 111 comprises a cup-shaped casing 115 which terminates at its open end in an outwardly directed ring flange 118; and which is similar to the casing 15 employed in the embodiment first described. Positioned snugly in the open end of casing 115 is an inverted, cup-shaped mask 121 with the marginal edge of its depending annular wall portion resting upon projections 117 in the casing 115. Mask 121 has two relatively large and nearly semi-circular apertures 124 and 125 therein which are spaced from one another on opposite sides of the centerline of casing 115 with their straight edges extending parallel to one another. Mask 121 also has two circular apertures 126 and 127 therein. Integral with the mid-portion of mask 121 are two, tongue-shaped projections 122 and 123 which extend horizontally away from one another into the respective openings 124 and 125. The bottom of the inverted cup-shaped mask 121 is depressed slightly except adjacent its marginal edge.

Seated upon the marginal portion 128 of the mask is a circular, transparent cover glass 131. Cover glass 131 is secured snugly across the open end of casing 115 by means of a conventional bezel 133 which overlaps the marginal edge of cover 131 and which is secured in an interlocking manner with the ring flange 118 on casing 115. A gasket 134 is adapted to be interposed between the confronting surfaces of the portion 128, cover glass 131 and bezel 133, thereby sealing the open end of casing 115 to prevent the entry of dust or moisture therethrough into the interior of the casing.

Mounted opposite one another in casing 115 are two indicator units 140 and 141 of conventional construction, and although unit 140 is illustrative of a typical mechanically operated unit, are mounted similar to the units 40 and 41 already described except that the U-shaped brackets for supporting their pointers 144 and 155 have their parallel upper and lower arms directed outwardly. The temperature of the coolant in the cooling system of the vehicle is intended to be indicated by unit 140, and the unit 141 is intended to indicate the level of the liquid fuel in the vehicle fuel tank.

Positioned in coplanar relation beneath the pointers 144 and 155, respectively, of the two units 140 and 141 are two semi-circular dial plates 161 and 162. The straight edges of dial plates 161 and 162 are slightly spaced from one another on opposite sides of the centerline of casing 115 and extend parallel to the straight edges of the semi-circular apertures 124 and 125 in mask 121. Each dial plate 161 and 162 has a notch therein extending from the medial portion of its straight edge radially outwardly to accommodate the bracket for the pivot shaft of the respective unit 140, 141. Adjacent its peripheral edge each dial plate 161 and 162 is secured by screws 166 to the tops of two annular spacers 167 (only one of which is illustrated in FIG. 7) which extend upwardly from the bottom of casing 115. The upper faces of dial plates 161 and 162 are inscribed with FUEL and TEMP. indicia (see FIG. 5) relating to coolant temperature and fuel level, respectively, as shown in FIG. 5.

Since indicating units 140 and 141 are mounted in casing 115 so that each of their respective pointers 144 and 155 is adapted to pivot about an axis adjacent the center of casing 115, the pointer pivot shafts and the pointer bushings are positioned so close to the center of casing 115 that they would tend to interfere or block out a substantial amount of the light which would be radially transmitted by a centrally disposed light bulb assembly of the type illustrated at 82 in the first described embodiment. Accordingly, two bulbs are employed to illuminate the face of the gauge of FIGS. 5 to 8. To accommodate these two illuminating bulbs, two inverted, cup-shaped light bulb housings 171 and 172 are positioned to extend through circular apertures into the casing 115 on opposite sides of the centerline thereof. Housings 171 and 172 are truncated-conical in configuration and terminate at their lower, open ends in outwardly directed flanges. The upper, closed end of each cup-shaped housing 171 and 172 is adapted to abut against the bottom of and form a seat for each of the dial plates 161 and 162 as shown in FIGS. 7 and 8. Housings 171 and 172 are centered in casing 115 between the circular apertures 126 and 127 in mask 121.

Also mounted in apertures in the bottom of casing 115 and extending therethrough in registry with the circular apertures 126 and 127 in mask 21 are inverted, cup-shaped bulb housings 175 and 176, respectively. Housings 175 and 176 are truncated conical in configuration and terminate at their lower, open ends in outwardly directed flanges respectively. The housings 175 and 176 have transverse webs adjacent their upper ends and extend upwardly into the space 183 between cover glass 131 and the depressed bottom of mask 121. They have peripheral shoulders on them which serve as seats for mask 121.

To sealingly secure each of the housings 171, 172, 175 and 176 in casing 115, sealing means such as gasket material or the like (not illustrated) is interposed between the confronting surfaces of each of the bulb housing bottom, edge flanges and the exterior surface of the bottom of casing 115. An elongate, one piece sealing or cover plate 191 has a shallow recess or depression in one face thereof fits over the lower flanged bottom ends of all four of the bulb housings. It has four circular apertures 193, 194, 195 and 196 in it for bulb housings 175, 171, 172 and 176, respectively. Each of the apertures 193 to 196 is adapted to accommodate a snap-in bulb assembly of the type illustrated by way of example in broken lines at 197 in FIG. 8. Plate 191 is welded or riveted to the exterior of casing 115 thereby sealingly securing the respective bulb housings 171, 172, 175 and 176 in their respective apertures in casing 115.

For use, the gauge illustrated in FIGS. 5 to 8 is adapted to be mounted on the vehicle by means of mounting clamps 198 which are bolted to casing 115 as shown in FIG. 6. Each of the bulb housings 171, 172, 175 and 176 is constructed of a transparent, plastic material capable of transmitting light. However, bulb housings 175 and 176, have their annular side walls rendered opaque by a coating or the like so that light may be transmitted only through their transverse upper end walls. Moreover, in this embodiment it is preferred that the words "OIL" and "AMP." be printed in black or white on the surfaces of the closed ends of these housings 175 and 176. It is preferred that such housing ends be tinted or otherwise colored red so as to be readily observable when their respective lights are energized. Transparent housings 171 and 172 are adapted to receive bulbs which are intended to illuminate the indicia and pointers 144 and 155 on the face of the gauge. Since the illuminating bulb housings 171 and 172 are offset from the axial centerline of casing 115, illumination from the spaced housings 171 and 172 is free to radiate outwardly over the indicating dials. As in the case of the first described embodiment, the sealed cover glass 131 and sealed housings 171, 172, 175 and 176 cooperate to prevent dust or moisture from entering the interior of casing 115 regardless of whether or not light bulb housings have been inserted into the back of the casing.

From the foregoing it will be apparent that the instant invention provides a simple and relatively inexpensive means to eliminate malfunctioning of the indicators in a cluster gauge from the seepage of moisture or dust into the gauge. Even if dirt were to filter into the back of the gauge around a lamp socket, the plastic jacket or lamp bulb housing would prevent the dust from entering the area of the operating parts of the indicators. Moreover, with applicant's device it is possible to remove the lamp and its socket from the cluster gauge without fear of having undesirable matter entering into the mechanical or electrical parts of the gauge. In addition, since the bulb housings or jackets employed by applicant are made of plastic, they are more readily sealed relative to the metallic gauge casing, and less subject to failure from shock loading and the like, than would be a glass or metallic jacket, a more uniform distribution of illumination is imparted to the dials. Furthermore, while the plastic bulb housings have been illustrated in conjunction with housings containing a plurality of gauges, it is apparent that one or more such bulb housings could be utilized to illuminate the interior of a housing containing a single gauge, whether such single gauge be responsive to pressure, temperature, speed, time or some other variable condition existing at the exterior of the gauge housing.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention what I claim is:

1. A cluster gauge comprising a casing closed at one end and open at its other end, a transparent cover secured over the open end of said casing, a plurality of indicators mounted in said casing to be visible through said transparent cover, said indicators being responsive to changes in different conditions existing at the exterior of said casing, said casing having at least one aperture therein, a hollow member, which is closed at one end and is open at its other end and which has an integral, laterally outwardly extending flange surrounding its open end, positioned in said aperture with its closed end extending into the interior of said casing adjacent said indicators, and means sealing said flange to said casing around said aperture to prevent the entry of dirt and moisture through said aperture into said casing, said member being adapted to have a light bulb removably positioned in the open end thereof, and at least a portion of said member being translucent to transmit light from said bulb to the interior of said casing.

2. A gauge as defined in claim 1 wherein said aperture is in the closed end of said casing, the closed end of said member extends towards to said transparent cover, and wherein said light transmitting portion of said member confronts said transparent cover, and the remaining portion of said member is opaque.

3. A cluster gauge comprising a casing closed at one end and open at its other end, a transparent cover secured over the open end of said casing, a plurality of spaced indicators mounted in said casing to be visible through said cover to measure, respectively different conditions at the exterior of said casing, said casing having a plurality of spaced apertures in the closed end thereof, a plurality of plastic bulb housings removably mounted in said apertures to extend into said casing between said spaced indicators, each of said housings having thereon a lateral flange which overlies the marginal edge of said casing around the aperture in which the housing is mounted, means sealing said flanges to said casing around said apertures, each of said bulb housings being adapted to have a light bulb removably positioned therein, and each of said housings having a truncated conical wall and a transverse wall integral therewith, all of the walls of at least one of said housings being translucent and the truncated conical wall of at least one other of said housings being opaque, the transverse wall of said other housing being translucent.

4. A cluster gauge comprising a casing closed at one end and open at its other end, a transparent cover secured over the open end of said casing, a plurality of spaced indicators mounted in said casing to be visible through said cover to measure, respectively, different conditions at the exterior of said casing, said casing having a plurality of spaced apertures in the closed end thereof, a plurality of plastic bulb housings removably mounted in said apertures to extend into said casing between said spaced indicators, each of said bulb housings being adapted to have a light bulb removably positioned therein, at least a portion of each housing transmitting light from its bulb into said casing, each of said housings having a flanged bottom, means sealing each of said housings around its flanged bottom in an aperture, and including a cover plate positioned over each flanged bottom to secure the associated housing to said casing, each cover plate adjacent its margin edge being secured to the exterior of the closed end of said casing to fix the associated housing in said casing, and each cover plate having an aperture therein to permit the insertion of a bulb into the associated housing.

5. A gauge comprising a generally cup-shaped casing, a transparent cover secured on said casing, indicator means mounted in said casing to be visible through said transparent cover, said indicator means being responsive to a change in a condition existing at the exterior of said casing, at least two generally cup-shaped housings, each of which extends through a separate aperture in said casing with its closed end disposed within said casing and with its open end communicating with the exterior of said casing, each of said housings having a circumferential flange adjacent its open end, and means surrounding said flanges and operatively sealing said flanges directly to said casing around said apertures to prevent the entry of dust and moisture into said casing through said apertures, said last-named means being adapted to hold light bulbs in said open ends of said housings, and at least the closed end of one of said housings being made of translucent material and having indicia thereon visible through said transparent cover, when the bulb in said one housing is lit, and at least one other of said cup-shaped housings having the annular wall portion thereof made of translucent material thereby to transmit light from said bulb to the interior of its casing.

References Cited by the Examiner
UNITED STATES PATENTS 2,189,536  2/40  Stuerzl _____ 116—129
2,837,053  6/58  Viret _____ 240—2.1 X RICHARD C. QUEISSER, *Primary Examiner.*